Feb. 25, 1958 O. TOS ET AL 2,824,323
GRILL SCRAPER AND CLEANER
Filed Jan. 13, 1956 2 Sheets-Sheet 1
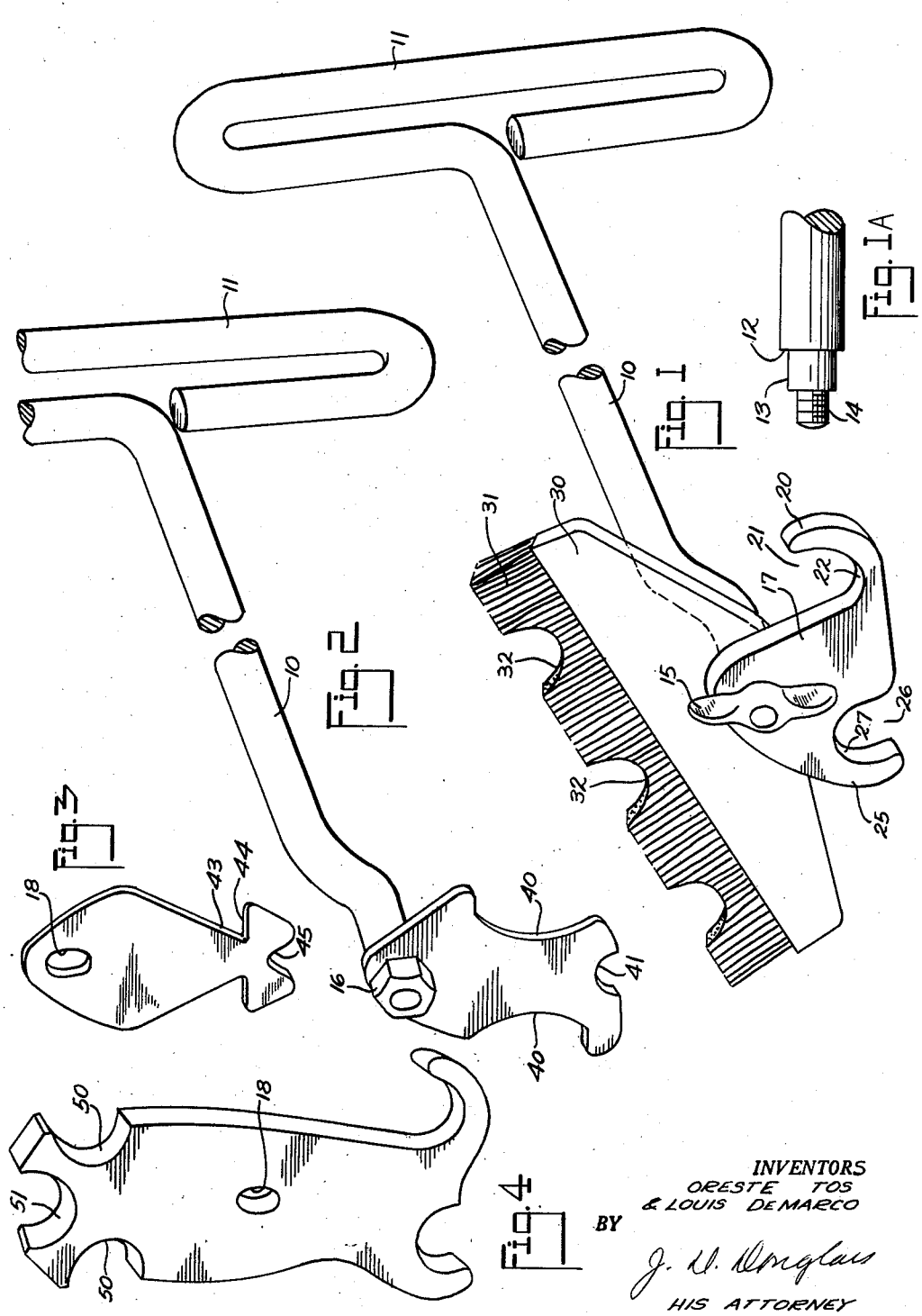
INVENTORS
ORESTE TOS
& LOUIS DEMARCO
BY
J. W. Douglass
HIS ATTORNEY Feb. 25, 1958     O. TOS ET AL     2,824,323
GRILL SCRAPER AND CLEANER Filed Jan. 13, 1956     2 Sheets-Sheet 2

INVENTORS
ORESTE TOS
& LOUIS DE MARCO
BY

*J. N. Douglass*

HIS ATTORNEY

United States Patent Office 2,824,323
Patented Feb. 25, 1958

2,824,323

GRILL SCRAPER AND CLEANER

Oreste Tos and Louis De Marco, Cleveland, Ohio

Application January 13, 1956, Serial No. 558,885

3 Claims. (Cl. 15—105)

This invention relates to cleaning tools and more particularly to a grill scraper and cleaner for cleaning of grills such as are commonly used in commercial kitchens wherein the grills comprise a series of spaced parallel longitudinally extending bars.

It is common practice in restaurants and the like to cook certain foods, such as meat, by grilling the same over a bed of coals, the meat being supported on top of the grills. This cooking process causes an accumulation of burnt food to form a coating or encrustation on the grills which must be removed from time to time otherwise it has a tendency to taint the food. It is difficult to clean the bars comprising the grill because no tool has been provided, hence they must be laboriously scraped by a knife or other sharp instrument. It is particularly difficult to clean the underside adjacent the opposite surfaces of the bars, and also difficult to effect the cleaning when a bed of hot coals is present, due to the heat.

By the present invention we have provided a grill cleaner which is quickly and easily applied to the grills and enables the tops and bottoms as well as the sides to be cleaned by a relatively simple operation in a short length of time. In addition, the cleaning can be carried on while the bed of coals underneath the grill is still incandescent without danger of burning the hands or clothing.

In the drawings:

Fig. 1 is a perspective view of a grill cleaning tool constructed according to the invention;

Fig. 1a is a fragmentary view of the blade engaging end of the tool;

Fig. 2 is a perspective view of another embodiment thereof;

Fig. 3 is a perspective view of a different type of blade useful with the tool of our invention;

Fig. 4 is a perspective view of another blade;

Figure 5:
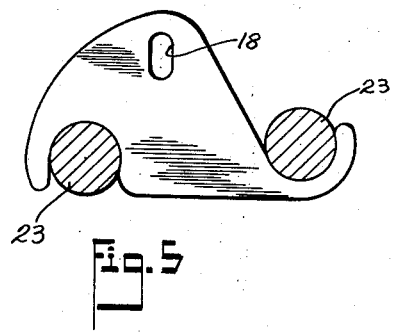
Fig. 5 is a view of the blade of Fig. 1 separated from the handle and illustrating its manner of cooperation with the grill bars.

Referring to the drawings, throughout which like parts are designated by like reference characters, there is illustrated a handle comprising a shank 10 having a T-shaped grip 11 on one end. The other end of the handle, Fig. 1a, is provided with a shoulder 12 adjacent to an oval or rectangular shank portion 13 and terminates in a threaded end 14 for the reception of a wing nut 15 or nut 16 as shown in Fig. 2.

A scraper blade, which may take various forms, is provided, the one shown in Fig. 1, comprises a substantially flat body 17 having a generally rectangular opening providing seat 18 (Fig. 5) arranged to engage with the shank end 13 of the handle. The body is held thereon by a wing nut against turning. Extending laterally on opposite sides of its point of attachment to the handle and below the plane of the handle the plate is provided with a hook shaped portion 20 which opens upwardly as at 21 and provides a curved scraping surface 22 for engagement with the round type of bar such as 23 shown in Fig. 5. On the other side there is provided a downwardly extending hook 25 which opens downwardly as at 26 and provides a curved scraping surface 27 for engagement with the top of the adjacent bar 23.

Also secured on the same shank portion 13 of the handle against rotation is a brush which comprises a bristle supporting body 30 which securely clamps a plurality of wire or other stiff bristles 31. The bristles are sheared to provide U shaped notches 32 spaced apart substantially the same distance as the bars 23.

In operation of the device of Fig. 1, the handle 11 is grasped and the hook 20 inserted between a pair of the bars and moved to the left to go under a bar to engage the scraping surface 22 with the underside of the bar. It is then rotated clockwise to bring the portion 27 over the top of the adjacent bar with the hook 25 engaging the far side. The position assumed at this time is best illustrated in Fig. 5. The tool may then be reciprocated longitudinally on the bars and simultaneously scrapes the sides and top of one bar and the sides and bottom of the adjacent bar after it is moved to the next succeeding bar and the operation continued until the entire tops and bottoms of the bars have been cleaned of their accumulated encrustation.

After the accumulated material has been loosened in this manner the tool may be removed by reversing the attaching operation and rotated 180°. The bar may then be brushed with the brush, the bars extending into the recesses 32 in the brush which readily cleans the loosened material from the top of the bars.

The tool illustrated in Fig. 2 has in the interest of simplicity omitted therefrom the brush. It will be appreciated, however, that the brush can be used with the tool of Fig. 2.

The blade of this tool is particularly adapted for the cleaning of bars which are of generally elliptical formation. In this instance when it is desired to engage the scraper with the grill bars, the handle is moved or swung laterally so that it extends generally transversely relative to the longitudinally extending bars after which the blade may be inserted downward between the bars. After the blade is disposed between the bars the handle is then rotated so that it is parallel to the bars which forces the seats or scraping surfaces 40 on opposite sides of the blade into engagement with the opposing sides of the adjacent bars. It will be noted that the conformation of the seats is complementary to that of the bars and that in this instance the sides as well as the top and bottoms of the adjacent bars may be scraped. The scraping is performed in the same manner as described for the embodiment of Fig. 1. After the sides of the bars have been scraped the tool is removed by reversing the above action at which time any accumulated material that has been scraped from the top of the bars may be removed by placing the blade with the scraping seat 41 on top of each bar and reciprocating longitudinally.

Figure 6:
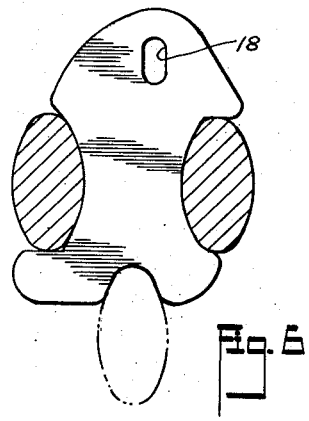
Fig. 6 is a similar view illustrating the blade of Fig. 2, and showing in dotted lines an alternative manner of its use.
Figure 7:
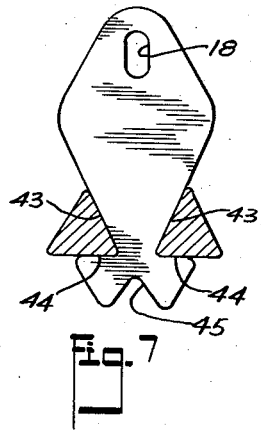
Fig. 7 is a view of the blade of Fig. 3 in use.

Fig. 7 shows a blade particularly adapted for the cleaning of bars of triangular cross-section where the narrow apex of the bar is at the top. In this instance the blade is used in the same manner as that described for Fig. 6 the seats 43 engaging the adjacent sides of the bars and the seats 44 engaging the bottoms of the bars to their midsection. After the bars are cleaned in the manner described the apexes may be further cleaned by the seat 45 in the manner described in connection with Fig. 6.

Figure 8:
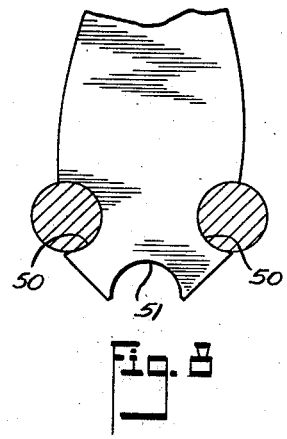
Fig. 8 is a fragmentary view of the blade of Fig. 4 in use.

Figs. 4 and 8 show a blade having cleaning surfaces below and above the axis of the handle. The lower cleaning surfaces are substantially the same and perform the same function and operation in the same manner as that described in connection with Fig. 1. The upper part of the bar in this instance is provided with a pair of semi-circular recesses 50 which correspond to the recesses 40 of the device in Fig. 6. In this instance, however, the recesses 50 may be in slightly more closely spaced relation than the scraping seats 27 and 22 at the other end. In addition, there is provided the end seat 51. As stated, the one end is used in exactly the same manner as the device of Fig. 1 and the other end may be used in exactly the same manner for that described in Fig. 6.

It will thus be seen that we have provided a cleaner which is exceedingly simple to operate. It enables two adjacent bars of the grill to be cleaned during one operation and its construction and design is such that the movement is largely a reciprocating movement, very little pressure being needed to remove the accumulated encrustation. It will be appreciated that in any of the embodiments greater pressure may be realized and an improved scraping action attained, where the encrustation is difficult to remove, by swinging the handle slightly to the right or to the left to bring one or both of the edges of the scraper against the bar. The degree of pressure being determined by the amount the handle is swung.

Preferably the scraper should be made of a hardened metal so that the edges remain relatively sharp over long periods of time. It may vary in thickness from ⅛ to ⅜ of an inch. I have found that ¼ inch stock provides a good scraping characteristic.

Having thus described the invention it will be understood that numerous and extensive departures may be made therefrom without departing from the spirit thereof as defined in the appended claims.

We claim:

1. A tool for scraping a grill having a plurality of equally spaced parallel bars, said tool comprising a blade having a narrow extension which is shaped and dimensioned to pass from one side of the grill freely between two adjacent bars of the grill and to extend at the opposite side of the grill, said blade at said extension having a first scraping edge which has a configuration corresponding to at least substantially one-half the periphery of a grill bar at said opposite side of the grill and arranged to engage said half when said extension is disposed at said opposite side of the grill, said blade having a second scraping edge spaced from said first scraping edge a distance substantially equal to the spacing between two adjacent grill bars and facing opposite to the direction in which said first scraping edge faces, said second scraping edge having a configuration corresponding to the other half of the periphery of said grill bar.

2. The tool of claim 1, wherein there is provided a handle connected to the blade at a portion of the blade which is disposed at said one side of the grill when said blade extension is disposed at said opposite side of the grill, said handle extending transverse to the blade and being positioned throughout its extent at said one side of the grill when said blade extension is disposed at said opposite side of the grill.

3. A tool for scraping a grill having a plurality of equally spaced parallel bars, said tool comprising a flat blade having opposite side edges, said blade having a first narrow hook-shaped extension projecting laterally from one of said side edges which is shaped and dimensioned to pass from one side of the grill freely between two adjacent bars of the grill and to extend at the opposite side of the grill with its free end passing partially around one of said pair of bars, said blade having a first convexly curved scraping edge which is defined by said one side edge of the blade and said first hook-shaped extension, said first scraping edge facing toward the grill when said first extension is disposed at said opposite side of the grill, said first scraping edge having a configuration corresponding to at least substantially one-half the periphery of a grill bar at said opposite side of the grill and arranged to engage said half when said first extension is disposed at said opposite side of the grill, said blade at the other of said side edges having a second narrow hook-shaped extension which is shaped and dimensioned to pass between the other bar of said pair and the next adjacent bar at the other side of said other bar, said blade having a second convexly curved scraping edge at said second hook-shaped extension which is spaced from said first scraping edge a distance corresponding to the spacing between two adjacent grill bars and facing opposite to the direction in which said first scraping edge faces for engagement with said other bar of the pair at said one side of the grill when said first scraping edge engages said one bar of the pair at said opposite side of the grill, said second scraping edge having a configuration corresponding to the other half of the periphery of said grill bar, and a handle connected to the blade at a location thereon which is disposed at said one side of the grill when said first extension is inserted between the grill bars from said one side of the grill and is positioned at said opposite side of the grill, said handle extending substantially perpendicular to the blade.

References Cited in the file of this patent
UNITED STATES PATENTS

| Number | Name | Date |
|---|---|---|
| 608,365 | Goehring | Aug. 2, 1898 |
| 633,737 | Shaw | Sept. 26, 1899 |
| 774,689 | McDermott | Nov. 8, 1904 |
| 828,189 | Burpee | Aug. 7, 1906 |
| 1,507,632 | Taylor | Sept. 9, 1924 |
| 1,760,268 | Cave | May 27, 1930 |
| 1,766,870 | Becker | June 24, 1930 |
| 2,719,316 | Hauser | Oct. 4, 1955 |
| 2,747,911 | Kuever | May 29, 1956 |